United States Patent [19]

Furukawa et al.

[11] Patent Number: 4,810,767

[45] Date of Patent: Mar. 7, 1989

[54] CURABLE COPOLYMER AND PROCESS FOR PREPARATION THEREOF

[75] Inventors: Hisao Furukawa, Kobe; Jo Kawamura, Akashi, both of Japan

[73] Assignee: Kanegafuchi Kagaku Kogyo Kabushiki Kaisha, Osaka, Japan

[21] Appl. No.: 112,859

[22] Filed: Oct. 27, 1987

[30] Foreign Application Priority Data

Oct. 29, 1986 [JP] Japan ................................ 61-257578

[51] Int. Cl.⁴ ............................................. C08F 30/08
[52] U.S. Cl. ..................................... 526/279; 528/32; 525/437; 525/440; 525/523; 525/528
[58] Field of Search ........................ 526/279; 528/32; 525/523, 528, 437, 440

[56] References Cited

U.S. PATENT DOCUMENTS

| | | | |
|---|---|---|---|
| 4,345,053 | 8/1982 | Rizk et al. | 525/440 |
| 4,491,650 | 1/1985 | Rizk et al. | 525/102 |
| 4,519,380 | 5/1985 | Laing | 126/422 |
| 4,567,107 | 1/1986 | Rizk et al. | 428/425.5 |
| 4,703,097 | 10/1987 | Wingler et al. | 526/279 |

FOREIGN PATENT DOCUMENTS 0159715 10/1985 European Pat. Off. .
0215402 3/1987 European Pat. Off. .

*Primary Examiner*—Melvyn I. Marquis
*Attorney, Agent, or Firm*—Armstrong, Nikaido, Marmelstein & Kubovcik

[57] ABSTRACT

A curable copolymer having a number average molecular weight of 1,000 to 100,000, and having the formula (1):

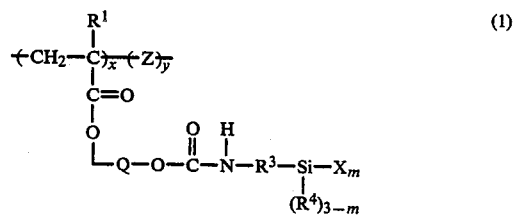

and a process for the preparation of the curable copolymer (1). The curable copolymer of the present invention has excellent flexibility, solvent resistance and adhesion to organic materials.

6 Claims, No Drawings

CURABLE COPOLYMER AND PROCESS FOR PREPARATION THEREOF

BACKGROUND OF THE INVENTION

The present invention relates to a curable copolymer, and more particularly to a vinyl curable copolymer having a hydrolyzable silyl group at the molecular ends or side chains, having excellent flexibility, solvent resistance and adhesion to organic materials, and a process for preparing the same.

Japanese Unexamined Patent Publication No. 36395/1979 discloses that a hydrolyzable silyl group-containing vinyl resin is excellent in curability at ordinary temperature, adhesion to inorganic materials such as concrete, glass, a steel plate and aluminum, and weatherability. However, the hydrolyzable silyl group-containing vinyl resin is unsatisfactory in flexibility, solvent resistance and adhesion to organic materials.

It is desired to improve the above-mentioned properties, i.e. flexibility, solvent resistance and adhesion to organic materials in the art of, for instance, an automotive refinishing paint.

In order to improve the flexibility, it is proposed to add a plasticizer such as butyl benzyl phthalate or a hydrolyzable silyl group-containing resin whose main chain is a flexible chain such as polyether or polyester to the vinyl resin. However, the flexibility can be improved, but the solvent resistance tends to lower.

It is disclosed in U.S. Pat. No. 3,632,557 (Brode et al) that a silyl group-containing polyester resin having N,N-disubstituted urea bond in its main chain is added to the vinyl resin. In such a case, both the flexibility and the solvent resistance can be improved since the N,N-disubstituted urea bond is large in the cohesion. However, the polyester resin is poor in compatibility with the silyl group-containing vinyl resin.

As aforementioned, it is difficult to improve both the flexibility and the solvent resistance of the hydrolyzable silyl group-containing vinyl resin by blending other components with the vinyl polymer.

Also, as a method for introducing a urethane bond having large cohesion into the silyl group-containing vinyl resin, for example, U.S. Pat. No. 4,491,650 (Rizk et al) discloses a coating resin obtained by reacting a polyacrylate or polymethacrylate havig an alcoholic hydroxyl group with an isocyanate silane. However, since the above coating resin does not have an ingredient capable of giving the flexibility such as polyether, polyester or polysiloxane in its molecule, the flexibility cannot be remarkably improved.

An object of the present invention is to provide a hydrolyzable silyl group-containing vinyl resin having excellent flexibility, solvent resistance and adhesion to organic materials.

A further object of the present invention is to provide a process for the preparation of the hydrolyzable silyl group-containing vinyl resin.

These and other objects of the present invention will become apparent from the following description.

SUMMARY OF THE INVENTION

In accordance with the present invention, there is provided a curable copolymer having a number average molecular weight from 1,000 to 100,000, and having the formula (1):

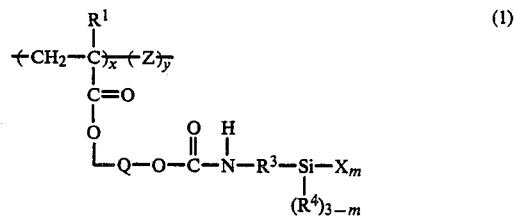

wherein $R^1$ is a hydrogen atom or an alkyl group having 1 to 10 carbon atoms; $R^3$ is a bivalent group having 1 to 10 carbon atoms selected from the group consisting of an alkylene group, an arylene group and an aralkylene group; $R^4$ is a monovalent group having 1 to 10 carbon atoms selected from the group consisting of an alkyl group, an aryl group, and an aralkyl group X is a hydrolyzable group selected from the group consisting of a halogen atom, an alkoxyl group, an acyloxy group, a ketoxymate group, an amino group, an acid amide group, an aminoxy group, a mercapto group and an alkenyloxy group; Q is a bivalent organic group containing at least one member selected from the group consisting an ester, a polyester, an ether, a polyether and a polysiloxane; Z is a unit of a vinyl monomer; m is an integer of 1 to 3; and each x and y is an integer of 1 to 100; and the process for preparation of the same.

DETAILED DESCRIPTION

In the present invention, there is provided a curable copolymer having a number average molecular weight of 1,000 to 100,000. The curable copolymer of the invention is prepared by copolymerizing a prepolymer (C) with a vinyl monomer (D). The prepolymer (C) is prepared by blocking an active hydrogen in a compound (A) having a C—C double bond and an alcoholic hydroxyl group at the both molecular ends and having a bivalent organic group containing at least one member selected from the group consisting an ester, a polyester, an ether, a polyether and a polysiloxane with an isocyanate silane (B).

As the polymerizable compound (A) used in the invention, there is exemplified a compound having the formula (2):

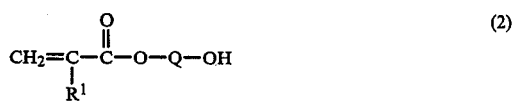

wherein $R^1$ is a hydrogen atom or an alkyl group having 1 to 10 carbon atoms, and Q is a bivalent organic group containing at least one member selected from the group consisting an ester, a polyester, an ether, a polyether and a polysiloxane.

In the compound (A), it is preferable to use a compound having the formula (2):

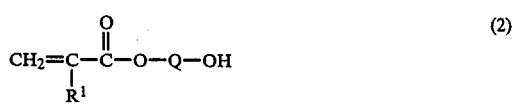

wherein Q is a polymer having at least one structure selected from the group consisting of a unit of the formula:

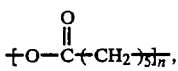

a unit of the formula:

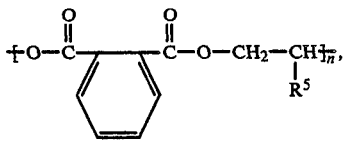

a unit of the formula:

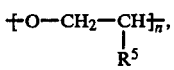

a unit of the formula:

a unit of the formula:

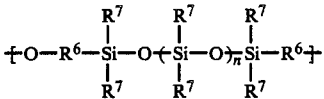

wherein $R^5$ is a hydrogen atom or an alkyl, aryl or aralkyl group having 1 to 10 carbon atoms, $R^6$ is a bivalent group of an alkylene, arylene or aralkylene group having 1 to 10 carbon atoms, $R^7$ is an alkyl, aryl or aralkyl group having 1 to 10 carbon atoms, and n is an integer of 1 to 100. The above polymer (Q) may be a homopolymer composed of the units of one kind or a block or random copolymer composed of the units of two or more kinds.

The compound (A) can be prepared according to methods mentioned below.

(1) A method in which alcoholic hydroxyl groups in the ester, polyester, ether, polyether or polysiloxane are partially condensed with an acrylic acid or methacrylic acid (hereinafter referred to as "(meth)acrylic acid") to give the compound (A).

(2) A method in which alcoholic hydroxyl groups in the ester, polyester, ether, polyether or polysiloxane are partially subjected to an addition reaction with a (meth-)acrylic acid ester having an isocyanate group to give the compound (A).

(3) A method in which the ring-opening-polymerization of an ε-caprolactone is carried out in the presence of a hydroxyl group-containing (meth)acrylate such as 2-hydroxy (meth)acrylate as a polymerization initiator, using a catalyst such as an organic titanate, tin chloride or perchloric acid to give a polyester-(meth)acrylate. Examples of the polyester-(meth)acrylate are, for instance, "TONE M-100" (which has a number average molecular weight ($\overline{M}n$) of 344 commercially available from Union Carbide Corp., "TONE 1350" (which has an $\overline{M}n$ of 570), "Placcel FA-1" (polycaprolactone containing acryloyl group at the side end, which has an $\overline{M}n$ of 230) commercially available from Daicel Chemical Industries, Ltd., "Placcel FA-2" (polycaprolactone containng acryloyl group at the side end, which has an $\overline{M}n$ of 344), "Placcel FA-3" (polycaprolactone containing acryloyl group at the side end, which has an $\overline{M}n$ of 458), "Placcel FA-4" (polycaprolactone containing acryloyl group at the side end, which has an $\overline{M}n$ of 572), "Placcel FA-8" (polycaprolactone containing acryloyl group at the side end, which has an $\overline{M}n$ of 1000), "Placcel FM-1" (polycaprolactone containing methacryloyl group at the side end, which has an $\overline{M}n$ of 244), "Placcel FM-2" (polycaprolactone containing methacryloyl group at the side end, which has an $\overline{M}n$ of 358), "Placcel FM-3" (polycaprolactone containing methacryloyl group at the side end, which has an $\overline{M}n$ of 472), "Placcel FM-4" (polycaprolactone containing methacryloyl group at the side end, which has an $\overline{M}n$ of 600), "Placcel FM-8" (polycaprolactone containing methacryloyl group at the side end, which has an $\overline{M}n$ of 1000), and the like.

(4) A method in which a polyester-(meth)acrylate is prepared by the ring-opening-polymerization of phthalic anhydride and propylene oxide in the presence of 2-hydroxyethyl (meth)acrylate as an initiator, using a tertiary amine such as dimethylbenzylamine as a catalyst.

(5) A method in which a polyether-(meth)acrylate is prepared by the ring-opening-polymerization of at least one member selected from ethylene oxide, propylene oxide and tetrahydrofuran in the presence of 2-hydroxyethyl (meth)acrylate or (meth)acrylic acid as an initiator, using a catalyst. Examples of the polyether-(meth-)acrylate are, for instance, "Blemmer PP-500" (polypropylene glycol monomethacrylate), "Blemmer pp-800" (polypropylene glycol monomethacrylate), "Blemmer PP-1000" (polypropylene glycol monomethacrylate), "Blemmer PE-90" (polyethylene glycol monomethacrylate), "Blemmer PE-200" (polyethylene glycol monomethacrylate), "Blemmer PE-350" (polyethylene glycol monomethacrylate), "Blemmer 70 PEP-350B" (polyethylene glycol-polypropylene glycol monomethacrylate: EO/PO=7/3 having), "Blemmer 55 PET-800 (polyethylene glycol-polytetramethylene glycol monomethacrylate), and the like.

As the polysiloxane having alcoholic hydroxyl groups used in the methods (1) and (2), there are exemplified an alcohol-modified silicone oil, for instance, commercially available from Nippon Unicar Kabushiki Kaisha under the trade name "F-99-199" or "F-99-258", and the like. Also, in the methods (1) and (2), the polyester, the polyether and the polysiloxane can be used alone or as an admixture thereof.

In the present invention, as the isocyanate silane (B), there is exemplified a silane coupling agent having an isocyanate group which is represented by the formula (3):

wherein $R^3$ is a bivalent group having 1 to 10 carbon atoms selected from the group consisting of an alkylene group, an arylene group and an aralkylene group; $R^4$ is a monovalent group having 1 to 10 carbon atoms selected from the group consisting of an alkyl group, an aryl group and an aralkyl group; X is a hydrolyzable group selected from the group consisting of a halogen atom, an alkoxyl group, an acyloxy group, a ketoxymate group, an amino group, an acid amide group, an aminoxy group, a mercapto group and an alkenyloxy group; and m is an integer of 1 to 3. In the formula (3), when more than one X groups is present, the X groups are the same or different, and when more than one $R^4$ groups is present, the $R^4$ groups are the same or different.

Representative examples of the isocyanate silane (B) are, for instance, γ-isocyanatepropyltrimethoxysilane, γ-isocyanatepropyltriethoxysilane, γ-isocyanatepropylmethyldimethoxysilane, γ-isocyanatepropylmethyldiethoxysilane, and the like.

The prepolymer (C) can be prepared by reacting the compound (A) having acryloyl group or methacryloyl group (hereinafter referred to as "(meth)acryloyl group") with the isocyanate silane (B) at a temperature from 60° to 200° C. in the substantial absence of water. In order to inhibit the radical polymerization reaction of (meth)acryloyl groups in the compound (A) during the above reaction, it is preferable to add a polymerization inhibitor such as hydroquinone, benzoquinone, phenothiazine, hydroquinone monomethyl ether or 2,6-di-t-buthyl-4-methyl phenol (BHT) to the reaction system before reacting. Hydroquinone monomethyl ether and BHT are especially preferable as the polymerization inhibitor from the standpoint of coloring of the prepolymer (C).

The reaction of the compound (A) and the isocyanate silane (B) can proceed in the absence of a catalyst, but there may be used a catalyst capable of promoting the addition reaction. Examples of the catalyst are, for instance, a tertiary amine such as dimethylbenzylamine, triethylamine or triethylenediamine, an organotin compound such as dibutyl tin dilaurate or tin octylate, and the like.

In the preparation of the prepolymer (C), the molar ratio of the isocyanate silane (B) to the compound (A) is from 0.1 to 10 moles, preferably from 0.8 to 1.2 moles, per mole of the compound (A). When the molar ratio of the isocyanate silane (B) to the compound (A) is less than 0.1, the effect that the flexibility, solvent resistance and adhesion to organic materials of the hyrolyzable silyl group-containing vinyl resin can be improved by copolymerizing the prepolymer (C) with the vinyl monomer can be exhibited little. On the other hand, when the molar ratio is more than 10, which is disadvantageous in cost though there is no problem from the standpoint of the preparation of the prepolymer (C) or properties of the obtained curable copolymer.

A solvent may be employed or not in the preparation of the prepolymer (C). When the preparation easily proceeds by using the solvent due to properties of the components used in the preparation, the solvent can be used. Examples of the solvents are, for instance, toluene, xylene, butyl acetate, and the like.

In the preparation of the prepolymer (C), it is necessary to previously exclude water from the reaction system. When an aromatic solvent such as toluene is employed, it is possible to previously exclude water from the reaction system by azeotropic distillation.

The thus obtained prepolymer (C) has an $\overline{Mn}$ from 200 to 60,000, preferably from 300 to 30,000.

The curable copolymer of the present invention can be prepared by copolymerizing the thus obtained prepolymer (C) with a vinyl monomer (D). The copolymerization of the prepolymer (C) with the vinyl monomer (D) is carried out in, generally, a random copolymerization. Also, a block copolymerization or a graft-copolymerization can be carried out. Further, the curable copolymer may be partially cross-linked.

The vinyl monomer (D) used in the present invention is not particularly limited. Examples of the vinyl monomer (D) are, for instance, an unsaturated carboxylic ester such as methyl (meth)acrylate (methyl acrylate or methyl methacrylate, hereinafter the same), ethyl (meth)acrylate, butyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, a diester or a halfester of a polycarboxylic acid (for instance, maleic acid, fumaric acid, itaconic acid, and the like) with a linear or branched alcohol having 1 to 20 carbon atoms; an aromatic hydrocarbon vinyl compound such as styrene, α-methylstyrene, chlorostyrene, styrenesulfonic acid, 4-hydroxystyrene or vinyl toluene; a vinyl ester such as vinyl acetate or vinyl propionate; an allyl compound such as diallylphthalate; a nitrile group-containing vinyl compound such as (meth)acrylonitrile; an epoxy group-containing vinyl compound such as glycidyl (meth)acrylate; an amino group-containing vinyl compound such as dimethylaminoethyl (meth)acrylate, diethylaminoethyl (meth)acrylate, vinylpyridine or aminoethyl vinyl ether; an amide group-containing vinyl compound such as (meth)acrylamide, itaconic diamide, α-ethyl(meth)acrylamide, crotonamide, maleic diamide, fumaric diamide, N-vinyl pyrrolidone, N-butoxymethyl (meth)acrylamide, N,N-dimethylacrylamide, N-methyl acrylamide or acryloyl morpholine; a hydroxyl group-containing vinyl compound such as 2-hydroxyethyl (meth)acrylate, 2-hydroxypropyl (meth)acrylate, 2-hydroxyethyl vinyl ether, N-methylol(meth)acrylamide, "Aronix 5700" commercially available from Toagosei Chemical Industry Co., Ltd., "Placcel FA-1", "Placcel FA-4", "Placcel FM-1" or "Placcel FM-4"; an unsaturated carboxylic acid such as (meth)acrylic acid, maleic acid, fumaric acid or itaconic acid or a salt (for instance, alkali metal salt, ammonium salt, amine salt, and the like) thereof; an unsaturated carboxylic anhydride such as maleic anhydride or a salt thereof; an other vinyl compound such as vinyl methyl ether, vinyl chloride, vinylidene chloride, chloroprene, butadiene, isoprene, maleimide, N-vinylimidazole or vinylsulfonic acid; a hydrolyzable silyl group-containing vinyl compound having the formula (4):

$$R^9-\underset{\underset{\displaystyle R^8}{|}}{Si}-X_0^1 \qquad (4)$$

wherein $R^8$ is a monovalent hydrocarbon group having 1 to 10 carbon atoms selected from the group consisting of an alkyl group, an aryl group and an aralkyl group, $R^9$ is an organic residue having a polymerizable double bond, X' is a hydrolyzable group selected from the group consisting of a halogen atom, an alkoxy group, an acyloxy group, a ketoxymate group, an amino group, an acid amide group, an aminoxy group, a mercapto group and an alkenyloxy group and a is an integer of 1 to 3; and the like. Examples of the hydrolyzable silyl group-containing vinyl compounds (4) are, for instance,

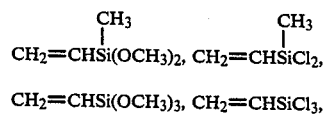

-continued

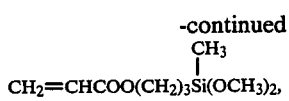

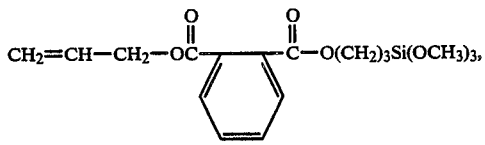

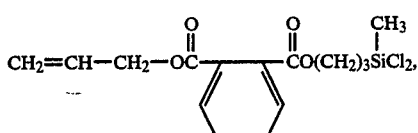

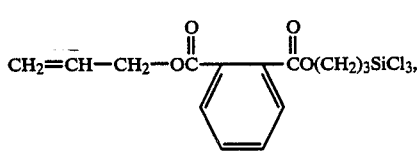

and the like.

When the hydrolyzable silyl group-containing vinyl compounds having the formula (4) are used as the vinyl monomer (D), since both the hydrolyzable silyl group in the prepolymers (C) and the hydrolyzable silyl group in the vinyl compound (4) can provide crosslinking points, the use of the hydrolyzable silyl group-containing vinyl compound (4) is effective for controlling properties of the film of the copolymer.

In the copolymerization, the amount of the prepolymer (C) is at least 0.1 part by weight, preferably at least 0.5 part by weight, per 100 parts by weight of the vinyl monomer (D). When the amount of the prepolymer (C) is less than 0.1 part by weight, properties of the curable copolymer cannot be improved.

The vinyl monomer (D) is copolymerized with the prepolymer (C), for instance, in the same manner as described in Japanese Unexamined Patent Publication No. 36395/1979 and No. 36109/1982, and the like. Also, a method using a radical polymerization initiator such as AIBN (azobisisobutyronitrile), a method using heat or rays of light or radiation, a bulk polymerization method, a solution polymerization method, and the like are applicable to the copolymerization of the vinyl monomer (D) and the prepolymer (C). Among them, the solution polymerization using an azo initiator is the most preferable.

In order to stabilize the curable copolymer of the invention, hydrolyzable esters such as methyl orthoformate, ethyl orthoformate, methyl orthoacetate and ethyl orthoacetate, and hydrolyzable silicon compounds such as ethyl silicate, methyl silicate or methyl trimethoxysilane can be used. These dehydrating agent may be added not only during the copolymerization but also after completing the copolymerization. The amount of the dehydrating agent is from 0 to 20 parts by weight, preferably from 0 to 10 parts by weight, based on 100 parts by weight (as a solid matter) of the curable copolymer of the invention.

The obtained curable copolymer of the invention has an $\overline{M}n$ from 1,000 to 100,000, preferably from 2,000 to 50,000.

The obtained curable copolymer of the present invention has the formula (1):

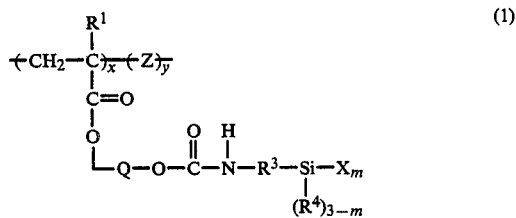

wherein $R^1$ is a hydrogen atom or an alkyl group having 1 to 10 carbon atoms; $R^3$ is a bivalent group having 1 to 10 carbon atoms selected from the group consisting of an alkylene group, an arylene group and an aralkylene group; $R^4$ is a monovalent group having 1 to 10 carbon atoms selected from the group consisting of an alkyl group, an aryl group and an aralkyl group; X is a hydrolyzable group selected from the group consisting of a halogen atom, an alkoxyl group, an acyloxy group, a ketoxymate group, an amino group, an acid amide group, an aminoxy group, a mercapto group and an alkenyloxy group; Q is a bivalent organic group containing at least one member selected from the group consisting of an ester, a polyester, an ether, a polyether and a polysiloxane; Z is a vinyl monomeric unit; m is an integer of 1 to 3; and each x and y is an integer of 1 to 100. When more than one X groups is present, the X groups are the same or different, and when more than one $R^4$ groups is present, the $R^4$ groups are the same or different.

When the curable copolymer of the invention is exposed to the atmosphere, fine network structure is gradually formed by atmospheric moisture to cure. The curing catalyst may be employed or not upon curing the curable copolymer of the invention. Examples of the curing catalyst are, for instance, an alkyl titanate; an acid compound such as phosphoric acid, p-toluenesulfonic acid or an acid phosphoric ester; an amine such as ethylene diamine or tetraethylenepentamine; an organotin compound such as dibutyltin dilaurate or dibutyltin maleate; a basic compound such as sodium hydroxide or sodium methylate; and the like. The curable copolymer of the invention can be cured in the same manner as described in Japanese Unexamined Patent Publication No. 105446/1982 or No. 124954/1984, and the like. The amount of the curing catalyst is from 0.005 to 10 parts by weight, preferably from 0.1 to 8 parts by weight, based on 100 parts by weight of the curable copolymer.

Usual additives such as fillers and pigments can be added to the curable copolymer of the invention. Also, a cellulosic resin such as nitrocellulose or cellulose acetate butyrate or a synthetic resin such as a polyvinyl chloride, a polyolefin or a polyester can be blended with the curable copolymer of the invention.

In addition to the properties of the silyl group-containing vinyl polymer including no prepolymer (C), the curable copolymer of the invention has the excellent flexibility, the excellent solvent resistance and the excellent adhesion to organic materials, and the properties thereof can be controlled according to desires. Therefore, the curable copolymer of the invention is suitable for use of paints, coating agents, adhesives, sealants, potting agents, primers, and the like.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

REFERENCE EXAMPLE 1

A reactor equipped with a stirrer, a thermometer, a nitrogen inlet tube and a condenser was charged with 752 g of Placcel FM-4 (polycaprolactone containing methacryloyl group at the side end, $\overline{M}n$: 586), 330 g of γ-isocyanatepropyltriethoxysilane ($\overline{M}w$: 257) and 720 g of xylene and the mixture was reacted with stirring at 80° C. for 1 hour and then 100° C. for 2 hours under nitrogen gas to give 1800 g of a prepolymer (C-1) (solid concentration: 60%).

The $\overline{M}n$ of the obtained prepolymer (C-1) measured by gel permeation chromatography (hereinafter referred to as "GPC") was 800.

REFERENCE EXAMPLE 2

A reactor equipped with a stirrer, a thermometer, a nitrogen inlet tube and a condenser was charged with 500 g of Blemmer PP-500 (polypropylene glycol monomethacrylate, $\overline{M}n$: 500), 257 g of γ-isocyanatepropyltriethoxysilane ($\overline{M}w$: 257), 2.5 g of 2,6-di-t-butyl-4-methyl phenol and 500 g of xylene and the mixture was reacted with stirring at 100° C. for 1 hour and then at 120° C. for 2 hours under nitrogen gas to give 1260 g of a prepolymer (C-2) (solid concentration: 60%).

The $\overline{M}n$ of the obtained prepolymer (C-2) measured by GPC was 750.

REFERENCE EXAMPLE 3

A one liter metal autoclave was charged with 26 g of 2-hydroxyethyl methacrylate, 148 g of phthalic anhydride, 58 g of propylene oxide, 1.0 g of 2,6-di-t-butyl-4-methyl phenol and 0.5 g of dimethylbenzylamine and the mixture was reacted at 100° C. After 3 hours, to the reaction mixture was added 50 g of propylene oxide and the reaction was continued. After the acid value of the reaction mixture attained to 0.5, excess propylene oxide was removed from the reaction mixture under reduced pressure. Then, 52 g of γ-isocyanatepropyltriethoxysilane was added to the reaction mixture, and the reaction was continued at 100° C. for 1 hour and then at 120° C. for 2 hours. Then, the resultant was diluted with xylene to give 305 g of a prepolymer (C-3) (solid concentration: 60%).

The $\overline{M}n$ of the obtained prepolymer (C-3) measured by the GPC was 1,400.

EXAMPLE 1

A reactor equipped with a stirrer, a thermometer, a nitrogen inlet tube, a dropping funnel and a codenser was charged with 540 g of xylene and 20 g of methyl orthoacetate and the mixture was heated to 110° C. A solution of 333 g of the prepolymer (C-1) (solid concentration: 60%) obtained in Reference Example 1, 200 g of styrene, 430 g of methyl methacrylate, 50 g of stearyl methacrylate, 100 g of γ-methacryloyloxypropyl trimethoxysilane, 20 g of acrylamide and 36 g of azobisisobutyronitrile was added dropwise to the reactor at 110° C. for 3 hours, to which 4 g of azobisisobutyronitrile was added, and the reaction was continued at 110° C. for 2 hours to give 1730 g of a desired curable copolymer.

In the infrared absorption spectrum (hereinafter referred to as "IR") of the obtained curable copolymer, the absorption based on methacryloyl group (from 1630 to 1640 cm$^{-1}$) was not seen. The $\overline{M}n$ measured by GPC was 6,000.

EXAMPLE 2

The procedure of Example 1 was repeated except that the prepolymer (C-1) was added in an amount of 666 g instead of 333 g to give a curable copolymer.

In the IR of the obtained curable copolymer, the absorption based on methacryloyl group (from 1630 to 1640 cm$^{-1}$) was not seen. The $\overline{M}n$ measured by GPC was 6,500.

EXAMPLE 3

The procedure of Example 1 was repeated except that the prepolymer (C-2) was employed instead of the prepolymer (C-1) to give a curable copolymer.

In the IR of the obtained curable copolymer, the absorption based on methacryloyl group (from 1630 to 1640 cm$^{-1}$) was not seen. The $\overline{M}n$ measured by GPC was 6,000.

EXAMPLE 4

The procedure of Example 1 was repeated except that the prepolymer (C-3) was employed instead of the prepolymer (C-1) to give a curable copolymer.

In the IR of the obtained curable copolymer, the absorption based on methacryloyl group (from 1630 to 1640 cm$^{-1}$) was not seen. The $\overline{M}n$ measured by GPC was 6,500.

COMPARATIVE EXAMPLE 1

The procedure of Example 1 was repeated except that the prepolymer (C-1) was not employed to give a curable vinyl polymer. The $\overline{M}n$ measured by GPC was 5,800.

TEST EXAMPLE 1

Test pieces were prepared as follows:
Dibutyltin maleate was added to each of the curable copolymer solutions obtained in Examples 1 to 4 and curable vinyl polymer obtained in Comparative Example 1 in an amount of 2 parts, based on 100 parts (as a solid matter) of the copolymer, which was coated on a mild steel plate polished with No. 240 water-proof abrasive paper. The coated steel plate was dried at 60° C. for 30 minutes to give a test piece. The obtained film of the test piece had a thickness of about 100μ.

The properties of the obtained film were measured as follows:

(1) Pencil hardness

After the test piece was allowed to stand at 23° C. for 1 day, 3 days or 7 days, the pencil hardness of the film was measured by a pencil hardness tester made by Toyo Seiki Kabushiki Kaisha in a load of 1 kg. The hardest hardness of the pencils which do not damage the film are shown in Table 1.

(2) Xylene-rubbing

After the test piece was allowed to stand at 23° C. for 7 days, the piece was rubbed ten times with an absorbent cotton impregnated with xylene. The surface state of the film was observed with the naked eye.

(3) Du pont-impact test

After the test piece was allowed to stand at 23° C. for 7 days, the Du pont-impact was measured with a core having a diameter of ½ inche. The highest weight and height causing no crack on the film are shown in Table 1.

(4) Adhesion after humidity test

After a melamine alkyd baking paint (commercially available under the trade name "AMILAC" made by Kansai Paint Kabushiki Kaisha) was coated on a mild steel plate, the plate was baked at 130° C. for 30 minutes. The surface of the melamine alkyd was sanded with a No. 400 water-proof abrasive paper and degreased, and then each of the curable copolymer solutions obtained in Examples 1 to 4 and Comparative Example 1 was coated and dried in the same manner as mentioned above to give a test piece having a film thickness of about 100μ. After the test piece was allowed to stand at ordinary temperature for 3 days and in a blister box (temperature: 50° C., RH≧98%) for 3 days, the adhesive test was carried out. The test piece was cut to form 50 squares each having a size of 2×2 mm and the procedure of adhesion-peeling off of cellophane adhesive tape was conducted. The number of remaining squares were counted. When there is no peeled square, the mark is 10, and when there is the adhered squares in about 10% per 100% of the peeled squares, the mark is 1.

TABLE 1

| Ex. No. | Pencil hardness | | | Xylene rubbing | Du Pont impact test | Adhesion after humidity test |
|---------|----------------|--------|--------|----------------|---------------------|------------------------------|
|         | 1 day | 3 days | 7 days |                |                     |                              |
| Ex. 1   | B     | HB     | H      | ◯ *2           | 300 g × 50 cm       | 10                           |
| Ex. 2   | B     | HB     | H      | ◉ *1           | >500 g × 50 cm      | 10                           |
| Ex. 3   | B     | HB     | H      | ◯              | 300 g × 50 cm       | 10                           |
| Ex. 4   | B     | HB     | H      | ◯              | 300 g × 50 cm       | 10                           |
| Com. Ex. 1 | B  | HB     | H      | △*3            | 300 g × 20 cm       | 1                            |

Estimation
*1 ◉ : No-damage
*2 ◯ : Slightly etched
*3 △: Definite loss of gloss were observed on the surface.

In addition to the ingredients used in the Examples, other ingredients can be used in the Examples as set forth in the specification to obtain substantially the same results.

What we claim is:

1. A curable copolymer having a number average molecular weight of 1,000 to 100,000, and having the formula (1):

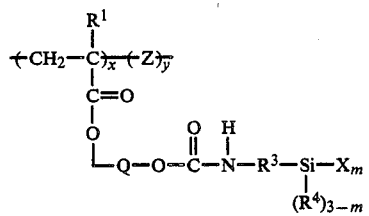

wherein $R^1$ is a hydrogen atom or an alkyl group having 1 to 10 carbon atoms; $R^3$ is a bivalent group having 1 to 10 carbon atoms selected from the group consisting of an alkylene group, an arylene group and an aralkylene group; $R^4$ is a monovalent group having 1 to 10 carbon atoms selected from the group consisting of an alkyl group, an aryl group and an aralkyl group; X is a hydrolyzable group selected from the group consisting of a halogen atoms, an alkoxyl group, an acyloxy group, a ketoxymate group, an amino group, an acid amine group, an aminoxy group, a mercapto group and an alkenyloxy group; Q is a bivalent organic group containing at least one member selected from the group consisting of an ester, a polyester, an ether, a polyether and a polysiloxane; Z is a vinyl monomeric unit; m is an integer of 1 to 3; and each x and y is an integer of 1 to 100.

2. The curable copolymer of claim 1, wherein said group Q is a group having at least one unit selected from the group consisting of a unit of the formula

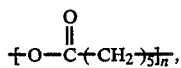

a unit of the formula:

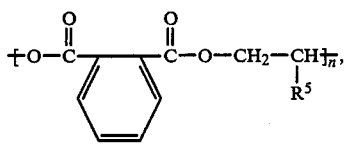

a unit of the formula:

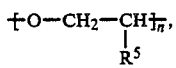

a unit of the formula:

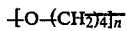

and a unit of the formula:

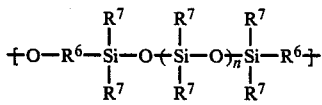

wherein $R^5$ is a hydrogen atom or a group having 1 to 10 carbon atoms selected from the group consisting of an alkyl group, an aryl group and an aralkyl group, $R^6$ is a bivalent group having 1 to 10 carbon atoms selected from the group consisting of an alkylene group, an arylene group and an aralkylene group; $R^7$ is a group having 1 to 10 carbon atoms selected from the group consisting of an alkyl group, an aryl group and an aralkyl group; and n is an integer of 1 to 100.

3. A process for the preparation of a curable copolymer having a number average molecular weight of 1,000 to 100,000, and having the formula (1):

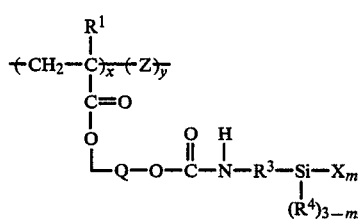

(1)

wherein $R^1$ is a hydrogen atom or an alkyl group having 1 to 10 carbon atoms; $R^3$ is a bivalent group having 1 to 10 carbon atoms selected from the group consisting of an alkylene group, an arylene group and an aralkylene group; $R^4$ is a monovalent group having 1 to 10 carbon atoms selected from the group consisting of an alkyl group, an aryl group and an aralkyl group; X is a hydrolyzable group selected from the group consisting of a halogen atom, an alkoxy group, an acyloxy group, a ketoxymate group, an amino group, an acid amide group, an aminoxy group, a mercapto group and an alkenyloxy group; Q is a bivalent organic group containing at least one member selected from the group consisting of an ester, a polyester, an ether, a polyether and a polysiloxane; Z is a vinyl monomeric unit; m is an integer of 1 to 3; and each x and y is an integer of 1 to 100; which comprises copolymerizing a prepolymer (C) with a vinyl monomer (D), said prepolymer (C) being prepared by reacting a compound (A) having a main chain containing at least one member selected from the group consisting of an ester, a polyester, an ether, a polyether and a polysiloxane and having both a C—C double bond and an alcoholic hydroxyl group at both molecular ends with an isocyanate silane (B).

4. The process of claim 3, wherein said compound (A) is a compound represented by the formula (2):

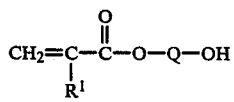

(2)

wherein $R^1$ is a hydrogen atom or an alkyl group having 1 to 10 carbon atoms, and Q is a bivalent organic group having a structure selected from the group consisting of an ester, a polyester, an ether, a polyether and a polysiloxane.

5. The process of claim 3, wherein said isocyanate silane (B) is a compound represented by the formula (3):

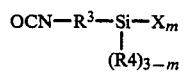

(3)

wherein $R^3$ is a bivalent group having 1 to 10 carbon atoms selected from the group consisting of an alkylene group, an arylene group and an aralkylene group; $R^4$ is a group having 1 to 10 carbon atoms selected from the group consisting of an alkyl group, an aryl group and an aralkyl group; X is a hydrolyzable group selected from the group consisting of a halogen atom, an alkoxyl group, an acyloxy group, a ketoxymate group, an amino group, an acid amide group, an aminoxy group, a mercapto group and an alkenyloxy group; and m is an integer of 1 to 3.

6. The process of claim 3, wherein said bivalent organic group Q is a group containing at least one unit selected from the group consisting of a unit of the formula:

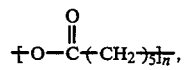

a unit of the formula:

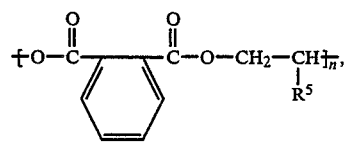

a unit of the formula:

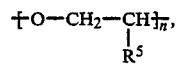

a unit of the formula:

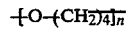

and a unit of the formula:

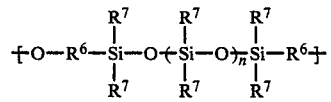

wherein $R^5$ is a hydrogen atom or a group having 1 to 10 carbon atoms selected from the group consisting of an alkyl group, an aryl group and an aralkyl group; $R^6$ is a bivalent group having 1 to 10 carbon atoms selected from the group consisting of an alkylene group, an arylene group and an aralkylene group; $R^7$ is a group having 1 to 10 carbon atoms selected from the group consisting of an alkyl group, an aryl group and an aralkyl group; and n is an integer of 1 to 100.

* * * * *